Figure 1:
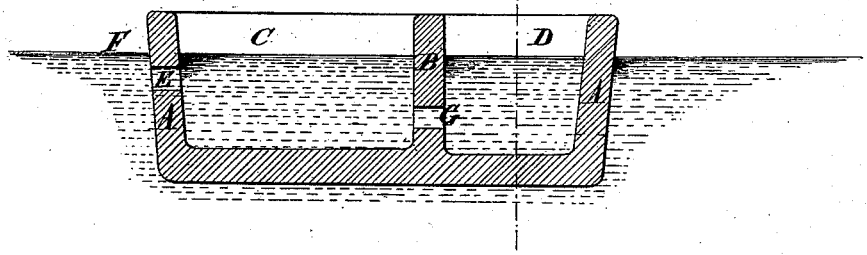

3 Sheets—Sheet 1.

F. SIEMENS.
MANUFACTURE OF GLASS.

No. 189,800. Patented April 17, 1877.

Attest:
H. L. Pennie
James W. Wright, Jr.

Frederick Siemens,
Inventor.
By James L. Norris,
Attorney.

N. PETERS, PHOTO-LITHOGRAPHER, WASHINGTON, D. C.

3 Sheets—Sheet 2.
F. SIEMENS.
MANUFACTURE OF GLASS.
No. 189,800. Patented April 17, 1877.
FIG: 5.
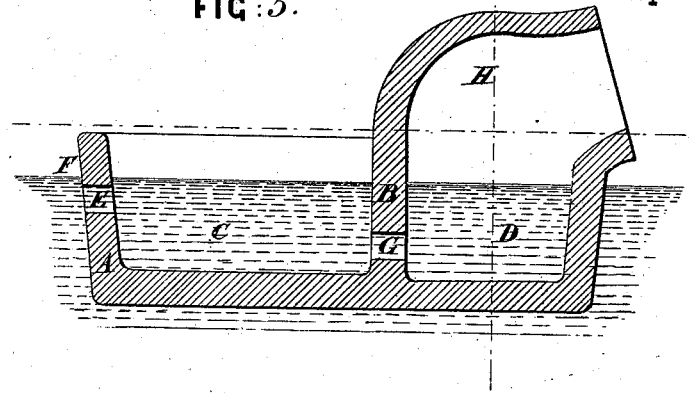
FIG: 6.
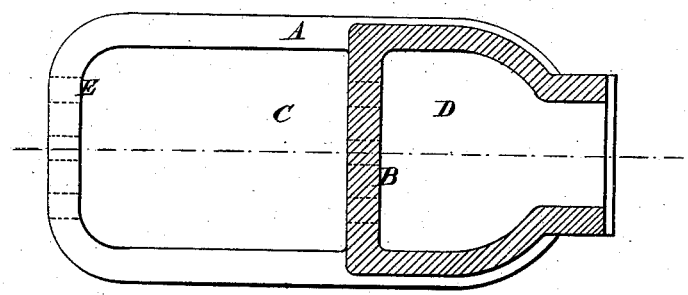
FIG: 7.
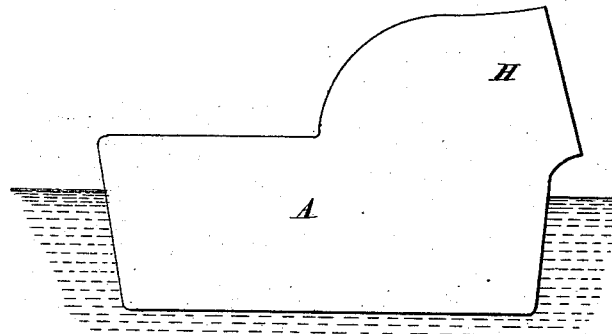
FIG: 8.
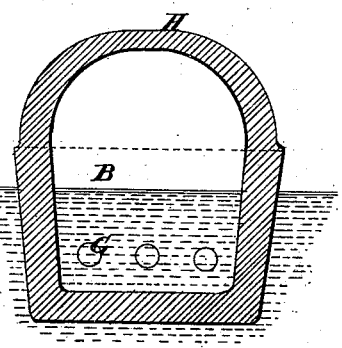
Attest:
H. R. Benne,
James M. Wright, Jr.
Frederick Siemens.
Inventor.
By James L. Norris.
Attorney.

3 Sheets—Sheet 3.
F. SIEMENS.
MANUFACTURE OF GLASS.
No. 189,800. Patented April 17, 1877.
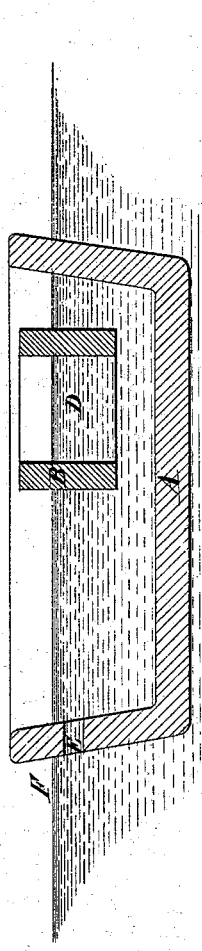
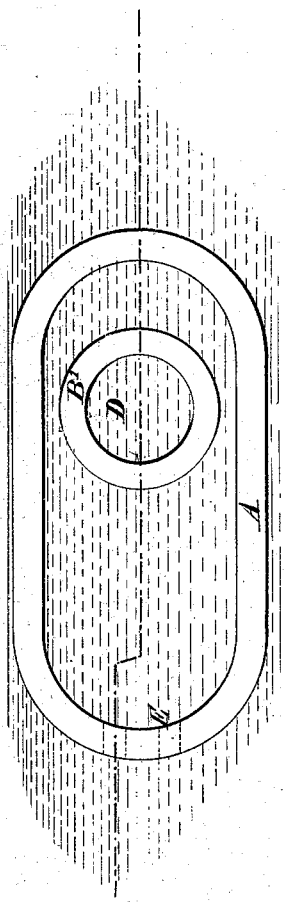

UNITED STATES PATENT OFFICE.

FREDERICK SIEMENS, OF DRESDEN, GERMAN EMPIRE.

IMPROVEMENT IN THE MANUFACTURE OF GLASS.

Specification forming part of Letters Patent No. 189,800, dated April 17, 1877; application filed March 13, 1877.

*To all whom it may concern:*

Be it known that I, FREDERICK SIEMENS, of Dresden, in the German Empire, have invented an Improvement in the Manufacture of Glass and Apparatus Therefor; and do hereby declare that the following description, taken in connection with the accompanying drawings hereinafter referred to, forms a full and exact specification of the same, wherein I have set forth the nature and principles of my said improvement, by which my invention may be distinguished from others of a similar class, together with such parts as I claim, and desire to secure by Letters Patent—that is to say:

My invention relates to an improved method and apparatus for fining and working out of glass more particularly in tank-furnaces, whereby the fining process is continuously carried on, and a considerably greater yield obtained with the same expenditure of fuel, as also a superior quality of glass, than in ordinary tank-furnaces.

According to my invention I construct a fire-clay vessel or boat, by preference of oblong shape, which swims in the liquid glass in the tank-furnace. The boat is divided by a cross-partition into two compartments, in the end of one of which are formed holes in such a position that, as the boat floats, they are situated just under the surface of the liquid glass in the tank, so that the melted material flows into the boat through these holes, entirely free from the impurities floating on the liquid in the tank. As the glass flows into this compartment it becomes more fined by the action of the heat at the surface than below, and, consequently, in becoming denser, it sinks to the bottom of the compartment, whence it flows through openings near the bottom of the partition into the second compartment, which is situated opposite the working-hole of the furnace, and from which the glass is worked out by the operator. If it is desirable to shield the glass in this second compartment somewhat from the heat of the furnace, the partition may be raised some height above the top of the boat, or the compartment may be covered in by a hood provided with an opening for working out the glass. If it be desired to carry the fining of the glass still further, this may be effected by constructing the boat with three or more separate compartments instead of only two, through which the glass is made to flow consecutively before it is worked out.

Instead of making the boat with a fixed partition, as described, it may contain a movable ring of fire-clay, which floats in the glass in the boat, the space within such ring serving as the second compartment, from which the glass is worked out. Such apparatus as above described may also be used in ordinary glass pots as well as in tank furnaces, the boats being made sufficiently small to float in the glass in the pots.

On the accompanying drawings are shown variously-modified forms of the before-described floating vessels or boats for operating according to my invention.

Figure 2:
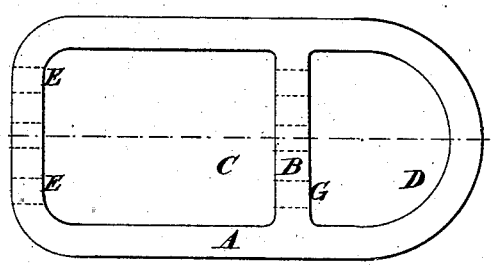
Figures 3, 4:
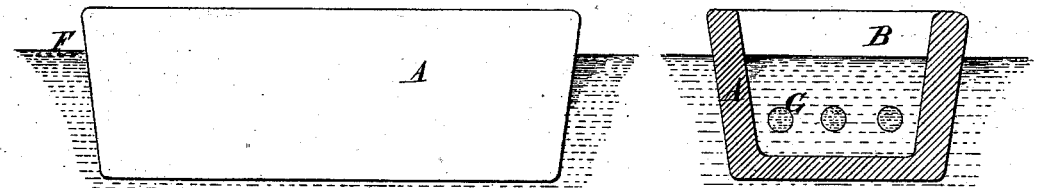

Figure 1 shows a longitudinal section, Fig. 2 a plan, Fig. 3 a side elevation, and Fig. 4 a cross-section, of one arrangement.

The fire-clay vessel or boat A is divided by a partition, B, into two compartments, C and D. Near the top of the compartment C are holes E E, through which the liquid glass can flow into the compartment, the boat being so formed that when floating these holes are situated just under the surface F of the glass in the tank or glass-pot. Near the bottom of the partition B are other holes G, through which the glass, as it sinks in the compartment C, flows into the compartment D, in order there to be worked out by the operator.

Figs. 5 to 8 show, respectively, a longitudinal section, a sectional plan, a side view, and a cross-section, of another construction, only differing from that first described in being provided with a hood, H, over the working-out compartment D, in order to protect the liquid glass therein from the heat of the furnace. The other parts being the same as before described are designated by the same letters of reference.

Fig. 9 shows a longitudinal section, and Fig. 10 a plan, of another modification, in which, in lieu of the fixed partition B of the former arrangements, there is provided a loose fire-clay ring, B', which floats in the glass in the boat, and the interior space D of which constitutes the compartment from which the glass is worked out, and into which it enters from below.

Having thus described the nature of my invention and in what manner the same is to be performed, I claim—

In an apparatus for continuously fining and working out glass from glass-tank furnaces or pots, consisting of a boat or vessel adapted to float in the molten glass, said boat being provided at one end with apertures, through which the glass flows from a point just below its level in the tank, the partition between the two compartments being provided with holes near its bottom, from which the glass flows to the final compartment, substantially as and for the purpose specified.

In testimony whereof I have signed my name to this specification in the presence of two subscribing witnesses this 6th day of February, 1877.

FREDERICK SIEMENS.

Witnesses:
G. W. BRAMWELL,
PAUL KASTEN.